US012630042B2

(12) United States Patent
Diamond et al.

(10) Patent No.: US 12,630,042 B2
(45) Date of Patent: May 19, 2026

(54) SYSTEM AND METHOD FOR MANAGING USE OF EVSE ASSEMBLY AND CHARGE PORT ASSEMBLY

(71) Applicant: Ford Global Technologies, LLC, Dearborn, MI (US)

(72) Inventors: Brendan Diamond, Grosse Pointe, MI (US); Christopher Schnettler, Sault Sainte Marie, MI (US); Jonathan Hair, Northville, MI (US); Keith Weston, Canton, MI (US); Stuart C. Salter, White Lake, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 761 days.

(21) Appl. No.: 18/104,474

(22) Filed: Feb. 1, 2023

(65) Prior Publication Data

US 2024/0253509 A1 Aug. 1, 2024

(51) Int. Cl.
*H02J 7/00* (2026.01)
*B60L 53/62* (2019.01)
*B60L 53/66* (2019.01)

(52) U.S. Cl.
CPC .............. *B60L 53/66* (2019.02); *B60L 53/62* (2019.02)

(58) Field of Classification Search
None
See application file for complete search history.

(56) References Cited

U.S. PATENT DOCUMENTS

| | | | |
|---|---|---|---|
| 9,075,098 B2 | 7/2015 | Schurman et al. | |
| 11,148,540 B2 | 10/2021 | Koolen et al. | |
| 2015/0054462 A1* | 2/2015 | Weidinger | H02H 5/047 |
| | | | 320/109 |
| 2015/0210174 A1* | 7/2015 | Settele | B60L 53/35 |
| | | | 320/109 |
| 2017/0124783 A1 | 5/2017 | Alm et al. | |
| 2022/0258636 A1 | 8/2022 | Schafferhans | |

FOREIGN PATENT DOCUMENTS

DE 102016218303 A1 3/2018

* cited by examiner

*Primary Examiner* — Arun C Williams
(74) *Attorney, Agent, or Firm* — David B. Kelley; Carlson, Gaskey & Olds, P.C.

(57) ABSTRACT

This disclosure relates generally to a system and method for managing the use of an electric vehicle supply equipment (EVSE) assembly and a charge port assembly of an electrified vehicle, including balancing usage and identifying potential wear of the same. Among other benefits, this disclosure is able to readily identify whether potential wear originates from the EVSE assembly or the charge port assembly.

14 Claims, 2 Drawing Sheets

SYSTEM AND METHOD FOR MANAGING USE OF EVSE ASSEMBLY AND CHARGE PORT ASSEMBLY

TECHNICAL FIELD

This disclosure relates generally to a system and method for managing the use of an electric vehicle supply equipment (EVSE) assembly and a charge port assembly of an electrified vehicle, including balancing usage and identifying potential wear of the same.

BACKGROUND

Electrified vehicles differ from conventional motor vehicles because they are selectively driven by one or more traction battery pack powered electric machines. The electric machines can propel the electrified vehicles instead of, or in combination with, an internal combustion engine. Some electrified vehicles, such as plug-in hybrid electric vehicles (PHEVs) and battery electric vehicles (BEVs), include a charge port assembly that is connectable to a plug of electric vehicle supply equipment (EVSE) assembly for charging the traction battery pack.

SUMMARY

In some aspects, the techniques described herein relate to a system, including: an electrified vehicle including a charge port assembly and a controller in communication with the charge port assembly, wherein the charge port assembly is configured to couple to an electric vehicle supply equipment (EVSE) assembly to charge a battery pack of the electrified vehicle during a charging operation, wherein the controller is configured to identify potential wear of the charge port assembly by comparing information associated with the charge port assembly during the charging operation with historical information of past charging operations of the electrified vehicle.

In some aspects, the techniques described herein relate to a system, wherein the controller is configured to identify potential wear of the charge port assembly when the information associated with the charge port assembly during the charging operation exceeds a predetermined threshold and the historical information of past charging operations of the electrified vehicle exhibits a trend toward the predetermined threshold.

In some aspects, the techniques described herein relate to a system, wherein the information associated with the charge port assembly during the charging operating is a temperature of the charge port assembly.

In some aspects, the techniques described herein relate to a system, wherein: the charge port assembly includes at least one temperature sensor in communication with the controller, and the controller is configured to interpret information from the at least one temperature sensor to determine the temperature of the charge port assembly.

In some aspects, the techniques described herein relate to a system, wherein the controller is configured to interpret information indicative of a resistance of a component of the charge port assembly to determine the temperature of the charge port assembly.

In some aspects, the techniques described herein relate to a system, wherein the information associated with the charge port assembly during the charging operation is a level of charge derate.

In some aspects, the techniques described herein relate to a system, wherein the controller is configured to identify potential wear of the EVSE assembly when the information associated with the charge port assembly during the charging operation exceeds a predetermined threshold and the historical information of past charging operations of the electrified vehicle does not exhibit a trend toward the predetermined threshold.

In some aspects, the techniques described herein relate to a system, wherein the controller is configured to identify potential wear of an EVSE assembly in a location if the trend is associated with historical information of past charging operations in the location.

In some aspects, the techniques described herein relate to a system, wherein the controller is configured to issue a message to a user recommending that the user discontinues further use of the EVSE assembly in the location.

In some aspects, the techniques described herein relate to a system, wherein the controller is configured to issue a message to a user recommending that the user discontinues further use of the EVSE assembly in the location unless an environmental temperature is below a predetermined threshold.

In some aspects, the techniques described herein relate to a system, wherein the controller is configured to issue a message to the EVSE assembly in the location indicating the EVSE assembly is potentially worn.

In some aspects, the techniques described herein relate to a system, wherein: if the controller identifies potential wear of the charge port assembly, the controller is configured to command the EVSE assembly to perform an operation to determine if a resistance of a component of the charge port assembly exceeds a predetermined threshold resistance.

In some aspects, the techniques described herein relate to a system, wherein the controller is configured to issue a message to a user when potential wear of the charge port assembly is identified.

In some aspects, the techniques described herein relate to a system, wherein the system further includes: an electric vehicle supply equipment (EVSE) assembly including at least one plug configured to couple to the charging port assembly, wherein another controller is configured to identify potential wear of the EVSE assembly based on historical information associated with past charging operations of EVSE assembly, and wherein, if potential wear of the EVSE assembly is identified, the other controller is configured to communicate the potential wear of the EVSE assembly to the electrified vehicle.

In some aspects, the techniques described herein relate to a system, including: an electric vehicle supply equipment (EVSE) assembly including at least one plug configured to couple to a charging port assembly of an electric vehicle and a controller, wherein the controller is configured to identify potential wear of the EVSE assembly based on historical information associated with past charging operations of EVSE assembly, and wherein, if potential wear of the EVSE assembly is identified, the controller is configured to communicate the potential wear of the EVSE assembly to an electrified vehicle coupled to the at least one plug.

In some aspects, the techniques described herein relate to a system, wherein the controller is configured to identify potential wear of the EVSE assembly based on historical information including at least one of use of the at least one plug, current throughput of the at least one plug, location of the EVSE assembly, and environmental conditions experienced by the EVSE assembly.

In some aspects, the techniques described herein relate to a system, wherein: the EVSE assembly includes a charger including a first plug and a second plug, each of the first and second plugs are configured to couple to a charging port assembly of an electric vehicle, and when the historical information associated with past charging operations of EVSE assembly indicates the first plug has been used in a greater number of charging operations than the second plug, the EVSE assembly is configured to issue a message indicating the second plug is recommended for use.

In some aspects, the techniques described herein relate to a method, including: identifying potential wear of a charge port assembly of an electrified vehicle by comparing information associated with the charge port assembly during a charging operation with historical information of past charging operations of the electrified vehicle.

In some aspects, the techniques described herein relate to a method, wherein potential wear of the charge port assembly is identified when the information associated with the charge port assembly during the charging operation exceeds a predetermined threshold and the historical information of past charging operations of the electrified vehicle exhibits a trend toward the predetermined threshold.

In some aspects, the techniques described herein relate to a method, further including: identifying potential wear of an electric vehicle supply equipment (EVSE) assembly when the information associated with the charge port assembly during the charging operation exceeds a predetermined threshold and the historical information of past charging operations of the electrified vehicle does not exhibit a trend toward the predetermined threshold.

DETAILED DESCRIPTION

This disclosure relates generally to a system and method for managing the use of an electric vehicle supply equipment (EVSE) assembly and a charge port assembly of an electrified vehicle, including balancing usage and identifying potential wear of the same. Among other benefits, which will be appreciated from the below description, this disclosure is able to readily identify potential wear of either the EVSE assembly or the charge port assembly, including interpreting information to identify whether the potential wear originates from the EVSE assembly or the charge port assembly, thereby permitting users of the EVSE assembly and/or the electrified vehicle to take appropriate responsive steps.

Figure 1:
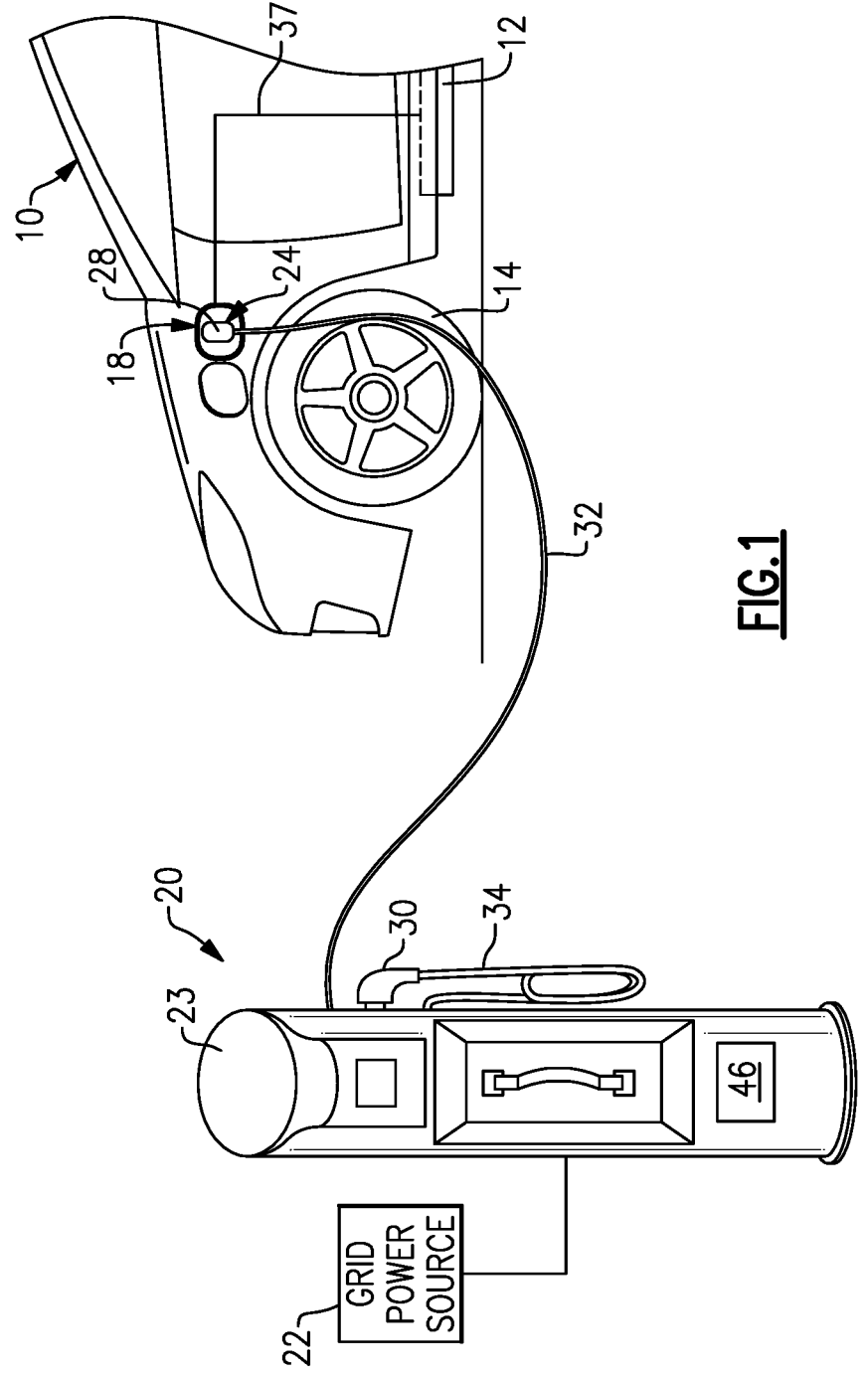
FIG. 1 illustrates a portion of an example electrified vehicle and an example electric vehicle supply equipment (EVSE) assembly.
Figure 2:
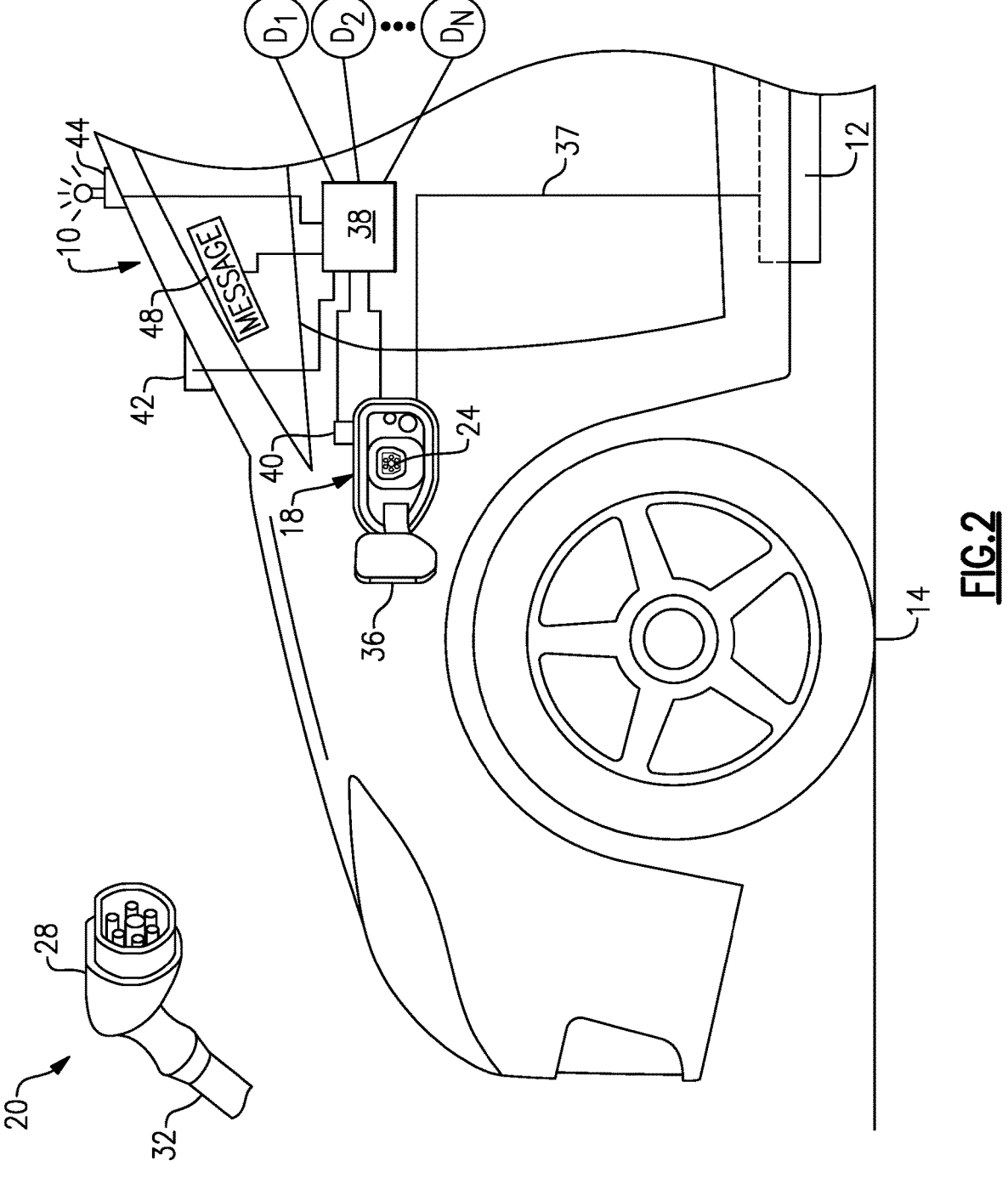
FIG. 2 is an enlarged view of a charge port assembly of the electrified vehicle and an example plug of the EVSE assembly.

FIGS. 1 and 2 illustrate a portion of an exemplary electrified vehicle 10 ("vehicle 10"), which includes a battery pack 12, which may be a traction battery pack. The vehicle 10 may include any electrified powertrain capable of applying a torque from an electric machine for driving drive wheels 14 of the vehicle 10. In an embodiment, the vehicle 10 is a plug-in hybrid electric vehicle (PHEV). In another embodiment, the electrified vehicle is a battery electric vehicle (BEV). Therefore, the powertrain may electrically propel the drive wheels 14 either with or without the assistance of an internal combustion engine.

The vehicle 10 of FIGS. 1-2 is a sedan. However, the teachings of this disclosure are applicable to other vehicle types, including cars, trucks, vans, sport utility vehicles (SUVs), etc.

Although shown schematically, the battery pack 12 may be a high voltage traction battery pack that includes a plurality of battery arrays (i.e., battery assemblies or groupings of battery cells) capable of outputting electrical power to one or more electric machines of the vehicle 10. Other types of energy storage devices and/or output devices can also be used to electrically power the vehicle 10.

From time to time, charging the battery pack 12 may be required or desirable. The vehicle 10 may therefore be equipped with a charge port assembly 18 (sometimes referred to as a vehicle inlet assembly) for charging the energy storage devices (e.g., battery cells) of the battery pack 12.

An electric vehicle supply equipment (EVSE) assembly 20 may be operably connected between the charge port assembly 18 and an external power source 22 for transferring power therebetween. In an embodiment, the external power source 22 includes utility grid power. In another embodiment, the external power source 22 includes an alternative energy source, such as solar power, wind power, etc. In yet another embodiment, the external power source 22 includes a combination of utility grid power and alternative energy sources. The external power source 22 may be accessed at a home of the user, a public charging station, etc.

The EVSE assembly 20 may include a charger 23 and at least one plug that can be coupled to a port 24 of the charge port assembly 18 to charge the battery pack 12 of the vehicle 10. In this example, the charger 23 includes a first plug 28 and a second plug 30. The port 24 may be configured as a male connector, including pins configured to couple to the first and second plugs 28, 30, which are configured as female connectors, including sockets configured to receive corresponding pins. While two plugs 28, 30 are shown, this disclosure extends to EVSE assemblies with chargers having one or more plugs. In an example, the charger 23 is located at a public charging station, and may be located at a shopping center, parking structure, workplace, condominium complex, etc.

The first plug 28 is connected to the charger 23 via a first cable 32, and the second plug 30 is connected to the charger 23 via a second cable 34. The EVSE assembly 20 may include additional components, such as a charge circuit interrupting device (CCID) for selectively disabling the transfer of power from the external power source 22 to the first and second plugs 28, 30 during various conditions.

In addition to the port 24, the charge port assembly 18 may include a charge port door 36 that is closed during typical operation of the vehicle 10. When charging the vehicle 10 from the external power source 22 is desired, the charge port door 36 can move to the open position shown in FIGS. 1 and 2. The charge port assembly 18 further includes components configured to transfer power from the port 24 to the battery pack 12, as represented schematically at 37. A user can couple the first plug 28 or the second plug 28 to the port 24 of the charge port assembly 18 so that power from the external power source 22 can be provided to the battery pack 12 of the vehicle 10 for charging the battery cells contained therein.

The port 24 of the exemplary charge port assembly 18 may be configured to receive AC power from the external power source 22. In another embodiment, the port 24 of the charge port assembly 18 is configured to receive DC power from the external power source 22. In yet another example, the port 24 is a combined AC/DC charge port that is configured to receive AC power, DC power, or both from the external power source 22. The EVSE assembly 20 may thus be configured to provide any level of charging (e.g., level 1, level 2, DC, etc.).

In this disclosure, the vehicle 10 includes a controller 38 configured to receive and interpret information, including information related to charging operations of the vehicle 10. The controller 38 includes electronics, software, or both, to perform the necessary control functions for operating the vehicle 10 and executing various functions of the vehicle 10. In one non-limiting embodiment, the controller 38 is a combination vehicle system controller and powertrain control module (VSC/PCM). Although it is shown as a single hardware device, the controller 38 may include multiple controllers in the form of multiple hardware devices, or multiple software controllers within one or more hardware devices.

The controller 38 is part of an overall computing system of the vehicle 10. In addition to the controller 38. The controller 38 is configured to receive and process a plurality of different types of data $D_1$-$D_N$, where "N" represents any number.

One example type of data $D_1$-$D_N$ includes, for example, a temperature of the port 24 or a temperature of a component associated with the charge port assembly 18, such as a temperature of a pin of the port 24. Alternatively, the data $D_1$-$D_N$ can include other data that the controller 38 can use to estimate or derive a temperature of the port 24 and/or a component of the port 24. In this respect, a sensor 40 is in communication with the controller 38. The sensor 40 is representative of a temperature sensor mounted adjacent the port 24 and/or a component of the port 24. Alternatively, the sensor 40 is able to generate a signal indicative of a resistance of a component of the port 24, such as a pin, and the controller 38 can use the signal to estimate a temperature of the corresponding component.

The data $D_1$-$D_N$ may also include environmental conditions of the vehicle 10. In this respect, the controller 38 is in communication with one or more sensors, such as sensor 42, configured to generate signals indicative of environmental conditions of the vehicle 10, such as a temperature, humidity, etc., of the environment immediately outside the vehicle 10.

The vehicle 10 may also include a transceiver 44 in communication with the controller 38. The transceiver 44 is configured to send and receive information between the vehicle 10 and other locations, including other vehicles, remote servers, and/or the EVSE assembly 20. The transceiver 44 may receive weather information pertaining to a location of the vehicle 10. The environmental conditions of the vehicle 10 may be determined using the transceiver 44 in addition to or as an alternative to the sensor 42. The transceiver 44 is also representative of a global positioning system (GPS) of the vehicle 10. In this respect, the data $D_1$-$D_N$ includes information usable by the controller 38 to determine the location of the vehicle 10 and/or the environmental conditions in the location of the vehicle 10.

The data $D_1$-$D_N$ may also include a level of power derate that occurs during a charging operation. A charging operation is an operation in which the EVSE assembly 20 is coupled to the vehicle 10, via the port 24 and one of the first and second plugs 28, 30, and is charging the battery pack 12. The level of power derate is the level of a reduction in power. The controller 38 receives information during the charging operation that indicates a lever of power transferred from the EVSE assembly 20 to the battery pack 12 during the charging operation. The level of power transferred from EVSE assembly 20 may derate as a temperature of components of the EVSE assembly 20 and/or the vehicle 10 approaches rated temperatures of those components during a charging operation, for example. The rated temperatures may be set by a manufacturer of the particular component and stored in the controller 38 and/or a controller 46 of the EVSE assembly 20.

The controller 46 of the EVSE assembly 20 includes electronics, software, or both, to perform the necessary control functions for operating the EVSE assembly 20 and executing various functions of the EVSE assembly 20. The controllers 38, 46 may communicate with one another when one of the first or second plugs 28, 30 is coupled to the port 24 or via the transceiver 44. The EVSE assembly 20 can include one or more transceivers. The data $D_1$-$D_N$ may include information the controller 38 receives from controller 46. The controllers 38, 46 can communicate with one another and with the various components of the vehicle 10 and the EVSE assembly 20 using one or more controller area networks (CANs).

While exemplary types of data have been described, the data $D_1$-$D_N$ may include additional types of data usable by the controller 38 and/or the controller 46 in identifying potential wear of the EVSE assembly 20 and/or the charge port assembly 18. Wear of the charge port assembly 18 or the EVSE assembly 20 can increase the resistance of the associated worn components, which increases heat generated during a charging operation, which in turn leads to power derating during the charging operation. In general, worn components lead to inefficient charging. In this disclosure, potential wear refers to any conditions of the charge port assembly 18 or the EVSE assembly 20 that cause reduced performed of those components during charging operations. An example of potential wear is corrosion of a pin of the charge port 24.

One aspect of this disclosure relates to identifying information that indicates one of the charge port assembly 18 or the EVSE assembly 20 has potentially worn and potentially requires some service or maintenance. Specifically, in this aspect of the disclosure, the controller 38 is able to identify potential wear and determine whether the potential wear originates with the charge port assembly 18 or the EVSE assembly 20.

If potential wear is identified during or following a charging process, the controller 38 can issue a message to a user of the vehicle 10. The message may be displayed on a human-machine interface 48, such as a screen of an infotainment system of the vehicle 10. The message could be sent to a mobile device, such as a phone of a user, to an operator of the EVSE assembly 20, and/or to a remote server for forwarding or evaluation.

In an aspect of this disclosure, the controller 38 is configured to identify potential wear of the charge port assembly 18 by comparing information associated with the charge port assembly 18 during a charging operation with historical information of past charging operations of the vehicle 10. In this respect, the controller 38 saves, or has access to via the transceiver 44, the historical information of past charging operations of the vehicle 10. The controller 38 may compare one type of data collected during a charging operation with the same type of data from a past charging operation or a series of past charging operations.

In an example, the controller 38 is configured to identify potential wear of the charge port assembly 18 when the information associated with the charge port assembly 18 during the charging operation exceeds a predetermined threshold and the historical information of past charging operations of the vehicle 10 exhibits a trend toward the predetermined threshold. In this disclosure, a trend refers to data that is changing or developing in a general direction over time, such as over at least two previous charging operations. The controller 38 may use algorithms and/or lookup tables to identify a trend.

In a particular example, the information associated with the charge port assembly 18 is temperature of a component of the charge port assembly 18, as determined based on information from the sensor 40. If the controller 38 determines that a temperature of the port 24 or another component of the charge port assembly 18 has exceeded a particular threshold corresponding to that component, such as a manufacturer-set temperature rating for that component, then the controller 38 will next determine if the relatively high temperature experienced by the component was indicated by a trend in historical data associated with past charging operations. By comparing the data from the present charging operation to historical data, the controller 38 can determine whether the potential wear originates from the charge port assembly 18 or the EVSE assembly 20.

In an example, if over the most recent previous three charging operations the temperature of the particular component was trending gradually closer to its manufacturer-set temperature rating, coupled with the fact that the controller 38 has already determined that the temperature of that component exceeded the manufacturer-set temperature rating in the most recent charging operation, then the controller 38 will determine that the potential wear originated from the charge port assembly 18 as opposed to wear of any components of the EVSE assembly 20. On the other hand, if there is no trend in data indicating that the particular component was trending gradually closer to the manufacturer-set temperature rating during recent charging operations, then the controller 38 will determine that the potential wear originates from the EVSE assembly 20.

In another aspect, the controller 38 alternatively or additionally performs a similar analysis with respect to a level of charge derate occurring during a particular charging operation. If the controller 38 determines that a level of charge derate exceeds a predefined threshold during a charging operation, the controller 38 will then use historical data to determine whether previous charging operations included levels of charge derating trending gradually closer to the predefined threshold. If such a trend is present, then the controller 38 will determine that the potential wear originates from the charge port assembly 18. If no such trend is present, then the controller 38 will determine that the potential wear originates from the EVSE assembly 20.

In additional aspect of this disclosure, the controller 38 is able to use location information in determining whether potential wear originates from the charge port assembly 18 or the EVSE assembly 20. For instance, in the above example, if the component of the charge port assembly 18 was trending toward its temperature rating over the previous charging operations, but was vehicle 10 has charged at the same EVSE assembly 20 during each of the previous charging operations, the controller 38 will not rule out the possibility that the EVSE assembly 20 is the origin of the potential wear. In that same example, however, if the vehicle 10 was charged at different EVSE assemblies in different locations, and the trend of increasing temperature is still present, the controller 38 will determine that the origin of the potential wear is the charge port assembly 18.

In a further aspect, the controller 38 uses location information to determine whether a particular EVSE assembly 20 in a particular location is the cause of the potential wear. For instance, if the level of charge derate exceeds a predefined threshold during a series of charging operations in a particular location but not in other locations, the controller 38 will then determine that the particular location includes one or more potentially worn EVSE assemblies. The controller 38 may issue a message to a user indicating the user should not use EVSE assemblies in that location in the future, in an example. Alternatively, the controller 38 may issue a message indicating that the user should discontinue further use of the EVSE assembly in that location unless an environmental temperature is below a predetermined threshold, during which conditions the relatively low outside temperature may be sufficient to absorb any excess heat that may otherwise occur during a charging operation.

If a potential wear condition is identified, the controller 38 may command the vehicle 10 and/or the EVSE assembly 20 to perform a test operation to determine if a resistance of one or more components of the charge port assembly 18 exceeds an expected resistance level, which would suggest a wear condition of that component. In a particular test operation, the EVSE assembly 20 injects current relative to the charge port assembly 18, and by using the output voltage of the EVSE assembly 20 and the input voltage of the charge port assembly 18, the controller 38 can determine a voltage drop between the EVSE assembly 20 and the input voltage of the charge port assembly 18, which can be used by the controller 38 to estimate the associated resistance of the charge port assembly 18. If the resistance exceeds a predetermined threshold, potential wear of the charge port assembly 18 will be confirmed.

In another aspect of this disclosure, if potential wear is confirmed, the controller 38 may issue a message to the user suggesting the vehicle 10 be serviced. A service station can inspect the charge port assembly 18 for corrosion, clean the charge port assembly 18, apply grease to the charge port assembly 18, etc., as indicated by the inspection.

Another aspect of this disclosure relates to preventing wear of the EVSE assembly 20. In an example, the controller 46 monitors historical information associated with past charging operations performed by the EVSE assembly 20. The controller 46 monitors the information for trends and compares the information to predefined thresholds.

The types of information monitored by the controller 46 includes, for example, the use of the first plug 28 and the use of the second plug 30. Specifically, the controller 46 monitors the number of times and the length of time each of the first and second plugs 28, 30 has been used in charging operations. The controller 46 also monitors, for example, lifetime current throughput of the first and second plugs 28, 30, charging station location (e.g., outdoors, uncovered or covered from the environment), environmental factors (e.g., time spent in cold conditions, time spent in hot conditions, times subject to snow, times subjected to rain).

The controller 46 is configured to identify potential wear of the EVSE assembly 20 based on historical information associated with past charging operations of EVSE assembly 20, including by determining if any of the above-listed types of information are trending toward a predefined threshold. In one particular example, if the first plug 28 has been used a number of times that is approaching or has reached a predefined threshold number of uses corresponding to potential wear of the first plug 28, the controller 46 will identify potential wear of the first plug 28. The EVSE 20 is configured to issue a message to a user of the vehicle 10, such as when the first plug 28 is inserted into the port 24, recommending that the user unplugs the first plug 28 and instead uses the second plug 30, assuming the second plug 30 has been used in fewer charging operations than the first plug 28 and/or is not also approaching or exceeding a predefined threshold number of uses. This aspect of the disclosure balances the use of the EVSE assembly 20, and therefore balances wear of the EVSE 20. This aspect of the disclosure may be particularly beneficial in situations in which users use some subset of the total available plugs at a charging station more frequently than other plugs at the charging station. This may occur for certain reasons, including proximity of the plugs to the entrance or exit of the charging station, the handedness of the user (i.e., right-handed users reach for a plug closer to their right hand), etc.

It should be understood that terms such as "about," "substantially," and "generally" are not intended to be boundaryless terms, and should be interpreted consistent with the way one skilled in the art would interpret those terms.

Although the different examples have the specific components shown in the illustrations, embodiments of this disclosure are not limited to those particular combinations. It is possible to use some of the components or features from one of the examples in combination with features or components from another one of the examples. In addition, the various figures accompanying this disclosure are not necessarily to scale, and some features may be exaggerated or minimized to show certain details of a particular component or arrangement.

One of ordinary skill in this art would understand that the above-described embodiments are exemplary and non-limiting. That is, modifications of this disclosure would come within the scope of the claims. Accordingly, the following claims should be studied to determine their true scope and content.

The invention claimed is:

1. A system, comprising:
an electrified vehicle including a charge port assembly and a controller in communication with the charge port assembly, wherein the charge port assembly is configured to couple to an electric vehicle supply equipment (EVSE) assembly to charge a battery pack of the electrified vehicle during a charging operation, wherein the controller is configured to identify potential wear of the charge port assembly by comparing information associated with the charge port assembly during the charging operation with historical information of past charging operations of the electrified vehicle,
wherein the controller is configured to identify potential wear of the charge port assembly when the information associated with the charge port assembly during the charging operation exceeds a predetermined threshold and the historical information of past charging operations of the electrified vehicle exhibits a trend toward the predetermined threshold, and
wherein the controller is configured to identify potential wear of the EVSE assembly when the information associated with the charge port assembly during the charging operation exceeds a predetermined threshold and the historical information of past charging operations of the electrified vehicle does not exhibit a trend toward the predetermined threshold.

2. The system as recited in claim 1, wherein the information associated with the charge port assembly during the charging operation is a temperature of the charge port assembly.

3. The system as recited in claim 2, wherein:
the charge port assembly includes at least one temperature sensor in communication with the controller, and
the controller is configured to interpret information from the at least one temperature sensor to determine the temperature of the charge port assembly.

4. The system as recited in claim 2, wherein the controller is configured to interpret information indicative of a resistance of a component of the charge port assembly to determine the temperature of the charge port assembly.

5. The system as recited in claim 1, wherein the information associated with the charge port assembly during the charging operation is a level of charge derate.

6. The system as recited in claim 1, wherein the controller is configured to identify potential wear of an EVSE assembly in a location if the trend is associated with historical information of past charging operations in the location.

7. The system as recited in claim 6, wherein the controller is configured to issue a message to a user recommending that the user discontinues further use of the EVSE assembly in the location.

8. The system as recited in claim 6, wherein the controller is configured to issue a message to a user recommending that the user discontinues further use of the EVSE assembly in the location unless an environmental temperature is below a predetermined threshold.

9. The system as recited in claim 6, wherein the controller is configured to issue a message to the EVSE assembly in the location indicating the EVSE assembly is potentially worn.

10. The system as recited in claim 1, wherein:
if the controller identifies potential wear of the charge port assembly, the controller is configured to command the EVSE assembly to perform an operation to determine if a resistance of a component of the charge port assembly exceeds a predetermined threshold resistance.

11. The system as recited in claim 1, wherein the controller is configured to issue a message to a user when potential wear of the charge port assembly is identified.

12. A system, comprising:
an electrified vehicle including a charge port assembly and a controller in communication with the charge port assembly, wherein the charge port assembly is configured to couple to an electric vehicle supply equipment (EVSE) assembly to charge a battery pack of the electrified vehicle during a charging operation, wherein the controller is configured to identify potential wear of the charge port assembly by comparing information associated with the charge port assembly during the charging operation with historical information of past charging operations of the electrified vehicle; and
an electric vehicle supply equipment (EVSE) assembly including at least one plug configured to couple to the charging port assembly, wherein another controller is configured to identify potential wear of the EVSE assembly based on historical information associated with past charging operations of the EVSE assembly, and wherein, if potential wear of the EVSE assembly is identified, the other controller is configured to communicate the potential wear of the EVSE assembly to the electrified vehicle.

13. A system, comprising:
an electric vehicle supply equipment (EVSE) assembly including at least one plug configured to couple to a charging port assembly of an electric vehicle and a controller, wherein the controller is configured to identify potential wear of the EVSE assembly based on historical information associated with past charging operations of the EVSE assembly, and wherein, if potential wear of the EVSE assembly is identified, the controller is configured to communicate the potential wear of the EVSE assembly to an electrified vehicle coupled to the at least one plug, wherein the EVSE assembly includes a charger including a first plug and a second plug, wherein each of the first and second plugs are configured to couple to a charging port assembly of an electric vehicle, and wherein, when the historical information associated with past charging operations of the EVSE assembly indicates the first plug has been used in a greater number of charging operations than the second plug, the EVSE assembly is configured to issue a message indicating the second plug is recommended for use.

14. The system as recited in claim 13, wherein the controller is configured to identify potential wear of the EVSE assembly based on historical information including at least one of use of the at least one plug, current throughput of the at least one plug, location of the EVSE assembly, and environmental conditions experienced by the EVSE assembly.

* * * * *